(12) United States Patent
Calderara

(10) Patent No.: US 6,224,945 B1
(45) Date of Patent: May 1, 2001

(54) PROCESS FOR THE MANUFACTURE OF A CROSSLINKED, TRANSPARENT, HYDROPHILIC AND PHOTOCHROMIC POLYMERIC MATERIAL, AND OPTICAL AND OPHTHALMIC ARTICLES OBTAINED

(75) Inventor: Isabelle Calderara, Mulhouse Bourtzwiller (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 09/391,136

(22) Filed: Sep. 7, 1999

Related U.S. Application Data

(63) Continuation-in-part of application No. 09/386,649, filed on Aug. 31, 1999, now abandoned.

(30) Foreign Application Priority Data

Aug. 2, 1999 (FR) .................................................. 9910030

(51) Int. Cl.[7] ....................................................... B05D 3/10
(52) U.S. Cl. .............................. 427/353; 427/354; 8/507; 351/159; 351/160 R; 351/162; 351/160 H
(58) Field of Search ................................. 8/507; 351/159, 351/160 R, 162, 160 H; 427/353, 354

(56) References Cited

U.S. PATENT DOCUMENTS

| 4,681,412 | | 7/1987 | Lemelson | 351/162 |
| 5,130,353 | * | 7/1992 | Fischer et al. | 427/372.2 |
| 5,851,585 | | 12/1998 | Gupta et al. | 427/162 |

FOREIGN PATENT DOCUMENTS

| 2305256 | | 4/1997 | (GB) . |
| 4-358117 | * | 12/1992 | (JP) . |
| WO 95/32440 | | 11/1995 | (WO) . |
| WO 96/04590 | | 2/1996 | (WO) . |
| WO 97/41468 | | 11/1997 | (WO) . |

\* cited by examiner

*Primary Examiner*—Erma Cameron
(74) *Attorney, Agent, or Firm*—Fulbright & Jaworski L.L.P.

(57) ABSTRACT

The process consists in dissolving a photochromic agent in a solvent, in impregnating the polymeric material with the solution of photochromic agent and in rinsing the polymeric material with an aqueous solution in order to replace the solvent with the aqueous solution. Application: to contact lenses.

25 Claims, No Drawings

PROCESS FOR THE MANUFACTURE OF A CROSSLINKED, TRANSPARENT, HYDROPHILIC AND PHOTOCHROMIC POLYMERIC MATERIAL, AND OPTICAL AND OPHTHALMIC ARTICLES OBTAINED

This application is a continuation-in-part of U.S. patent application Ser. No. 09/386,649, filed Aug. 31, 1999, now abandoned, which claims the benefit of priority from French patent application number 99/10030 filed Aug. 2, 1999.

The invention generally relates to a process for the manufacture of crosslinked, transparent, hydrophilic and photochromic polymeric materials and to the use of the latter in the manufacture of optical and ophthalmic articles having photochromic properties and in particular contact lenses.

It is known to manufacture photochromic contact lenses by incorporation of a photochromic compound, such as a spirooxazine compound, in the mixture of polymerizable monomers resulting, after polymerization in a mould, in the final contact lens.

Thus, Patent Application WO 96/04590 discloses the manufacture of photochromic contact lenses made of methyl methacrylate (MMA) and N-vinylpyrrolidone (NVP) copolymer, which consists in introducing a spirooxazine compound into a mixture of MMA and NVP monomers, in the presence of alkyl methacrylate as crosslinking agent and of azobisisobutyronitrile (AIBN) as thermal initiator, and in subsequently thermally polymerizing the mixture.

This technique, commonly known as "cast in place", is also used in Patent EP-A-277,639, which discloses the incorporation, in a base monomeric mixture (in particular, based on hydroxyethyl methacrylate (HEMA)), of a spirooxazine compound comprising an organic functional group which can be polymerized by addition or by ring opening. The mixture is subsequently polymerized. The photochromic compound, thus fixed within the material constituting the lens, is assumed not to be eluted in the lacrymal medium.

This "cast in place" process for the photochromic compounds exhibits numerous disadvantages.

Photochromic compounds are compounds which are sensitive to the action of the free radicals formed during the polymerization of mixtures of monomers by activation of the initiator. Under the effect of these free radicals, photochromic compounds, in particular spirooxazine compounds, are liable to decompose, generating coloured by-products. The result of this is, on the one hand, an overall decrease in the effectiveness of the photochromic compound, a portion of which has been destroyed, and, on the other hand, a permanent colouring brought about in the lens by these coloured by-products, which is not desired.

In addition, a significant disadvantage is that these by-products can exhibit a toxic nature, while, because of their low molar masses, they can diffuse through the lens towards the eye of the wearer.

Thus, while this "cast in place" technique could be used with some success in the manufacture of opthalmic glasses intended for spectacles, this does not apply in the production of contact lenses and, to the knowledge of the inventors, no photochromic hydrophilic contact lens has been marketed to date.

The possibly toxic nature of the by-products formed during the polymerization renders this "cast in place" technique virtually unusable in the case of contact lenses.

The fact that, in the "cast in place" process for photochromic compound of Patent EP-A-277,639, the latter is fixed to the polymeric network constituting the contact lens is invalid with regard to the decomposition by-products.

Furthermore, the technique of Patent EP-A-277,639 limits the possible choice of the photochromic compounds which can be used.

The "cast in place" technique lacks flexibility at the industrial level insofar as it is impossible to render photochromic already existing lenses, which necessitates disposing of large stocks of photochromic contact lenses.

Finally, the "cast in place" technique does not make it possible to incorporate the photochromic compound in predetermined chosen regions of the lens.

In particular, hydrophilic contact lenses exhibit a diameter greater than that of the iris and it may be aesthetically advantageous to render photochromic just the central part of the contact lens covering the pupilary region of the eye of the wearer.

The object of the invention is therefore to provide a process for the production of crosslinked, transparent, hydrophilic and photochromic polymeric materials which solves the above problems, materials which make it possible to prepare photochromic contact lenses which are preferably resistant to the sterilization treatments, in particular thermal sterilization treatments, conventionally used.

According to the invention, the process for producing a crosslinked, transparent, hydrophilic and photochromic polymer material comprises:

(a) dissolving a photochromic agent in a solvent or mixture of solvents capable of at least partially dissolving the photochromic agent, in order to obtain a photochromic impregnating solution;

(b) impregnating a crosslinked, transparent and hydrophilic polymeric material with the photochromic impregnating solution, in order to obtain a material impregnated with photochromic solution;

(c) rinsing the impregnated material with an aqueous solution, in order to replace, with the aqueous solution, the solvent impregnated in the material; and (d) recovering the crosslinked, transparent, hydrophilic and photochromic polymeric material.

The process of the invention applies to any type of crosslinked, transparent and hydrophilic polymeric material suitable for the manufacture of contact lenses.

In the context of the present invention, the term "hydrophilic material" is understood to mean any material having a degree of hydrophilicity of greater than or equal to 10% and preferably of greater than or equal to 35%.

Particularly preferred materials are those having a degree of hydrophilicity of 50% or more.

As is conventional, the term "degree of hydrophilicity" is understood to mean the maximum percentage, by weight, of water which a polymeric material can fix.

The hydrophilic polymeric materials are generally obtained by polymerization, preferably in the presence of a crosslinking agent, of at least one of the following monomers:

hydroxyalkyl (meth)acrylates, alkoxy derivatives of hydroxyalkyl (meth)acrylates, aminoalkyl (meth)acrylates, monovinyl ethers, monovinyl polyethers, hydroxylated vinyl ethers, N-vinyllactams, amido derivatives of (meth)acrylic compounds, ionic monomers, zwitterionic monomers, oligomers of the abovementioned monomers and their mixtures.

The recommended hydroxyalkyl (meth)acrylates are those in which the alkyl group generally comprises from 1 to 4 carbon atoms.

Specific examples of hydroxyalkyl (meth)acrylate are 2-hydroxyethyl methacrylate (HEMA), hydroxypropyl acrylate, hydroxypropyl (meth)acrylate and 2,3-dihydroxypropyl methacrylate (glyceryl methacrylate).

The recommended alkoxy derivatives of hydroxyalkyl (meth)acrylates are the mono-, di- or triethoxylated compounds having an alkyl group generally comprising from 1 to 4 carbon atoms.

Mention may be made, among the monomers of the N-vinyllactam type, of N-vinyl-2-pyrrolidone (NVP), N-vinyl-2-piperidone and N-vinylcaprolactam.

Mention may be made, among the amido derivatives of (meth)acrylic compounds which are of use, of (meth)acrylamide, N-methyl(meth)acrylamide, N-isopropyl(meth)acrylamide, N-diacetone(meth)acrylamide, N,N-dimethyl(meth)acrylamide, N,N-dimethylaminomethyl-(meth)acrylamide, N,N-dimethylaminoethyl-(meth)-acrylamide and N-methylaminoisopropyl(meth)-acrylamide. Mention may be made, among the aminoalkyl (meth)acrylates, of aminoethyl (meth)acrylate, dimethylaminoethyl methacrylate, methylaminoethyl methacrylate and diethylaminoethyl methacrylate.

Mention may be made, among the hydrophilic ionic monomers, of (meth)acrylic acid, as well as of cationic monomers, such as quaternary ammonium derivaties of (meth)acrylic acid.

Mention may be made, among the zwitterionic monomers, of those disclosed in Patent Application WO 92/07885. The latter monomers generally make it possible to reduce the affinity of the hydrogel with respect to the proteins in the lacrymal medium.

Examples of conventional crosslinking agents are ethylene glycol di(meth)acrylate, polyethylene glycol di(meth)acrylate, such as diethylene glycol di(meth)acrylate or triethylene glycol di(meth)acrylate, long-chain di(meth)acrylates, such as hexamethylene di(meth)acrylate, vinyl (meth)acrylate, allyl (meth)acrylate, divinylbenzene, diallyl phthalate and trimethylolpropane trimethacrylate.

These crosslinking agents are generally present in a concentration of 0.1 to 2% by weight in the starting monomeric mixture resulting in the hydrophilic polymers which are used in the context of the invention.

The preferred hydrophilic polymeric materials are those obtained from vinyllactam (including N-vinylpyrrolidone) and/or from N,N-dimethylacrylamide.

The polymeric materials used in the process of the invention are preferably nonionic materials.

A preferred class of polymeric materials is composed of multiphase polymeric materials, in particular two-phase polymeric materials. Multiphase polymeric materials are materials in which the major part of the polymeric network is formed of distinctive microdomains (with a size generally of 0.005 to 0.25 µm) of two or more different materials.

Such networks are generally obtained by copolymerization of a mixture of monomers exhibiting reactive functional groups of different natures, for example by copolymerization of a (meth)acrylic or (meth)acrylamide monomer with an allylic or vinyl monomer.

The multiphase polymeric material is preferably formed by polymerization of a monomeric mixture comprising at least one hydrophobic monomer and one hydrophilic monomer.

The preferred hydrophobic monomers are $C_1$–$C_{10}$ alkyl (meth)acrylates, in particular methyl (meth)acrylate, and their fluorinated or silicone derivatives, ethoxyethyl methacrylate, cyclohexyl methacrylate, dimethyloxobutyl methacrylate, vinyl derivatives, such as styrene or divinylbenzene, hydrocarbon-comprising dienes, vinyl chloride and acrylonitrile.

Mention may be made, among the hydrophilic monomers, of vinyl monomers, such as N-vinylpyrrolidone (NVP), hydroxyalkly methacrylates, such as hydroxyethyl methacrylate (HEMA), and N,N-dimethylacrylamide.

Generally, hydrophilic monomers which do not comprise protic groups will preferably be chosen.

Examples of two-phase hydrophilic polymeric materials which are preferred are methyl methacrylate (MMA)/N-vinylpyrrolidone (NVP) copolymers and methyl methacrylate (MMA)/N,N-dimethylacrylamide copolymers.

The preferred two-phase polymeric material is an MMA/NVP copolymer in a ratio by weight of approximately 30/70, which is the material constituting the Lunelle® lenses from the Company Essilor, or else the material constituting the Rythmic® lenses from the company Essilor, which is an MMA/NVP copolymer in a ratio by weight of approximately 28/72.

This two-phase polymeric material is a hydrogel composed of MMA (hydrophobic) microdomains of approximately 0.02 µm, which are crosslinked by triethylene glycol dimethacrylate (TEGDMA), within a swollen NVP gel, crosslinked by triallyl isocyanurate (TAIC) bridges.

Without wishing to be bound by any one theory, it is believed that, during the implementation of the process of the invention with two-phase polymeric materials as described above, the photochromic agent, overall hydrophobic in nature, is for the most part concentrated in the hydrophobic regions of the two-phase gel, in this case the PMMA regions, which will explain the stability and the effectiveness of the photochromic agent (in particular the good kinetics), even in an aqueous medium.

The hydrophilic polymers used in the context of the invention can comprise conventional additives, in particular UV absorbers, in proportions such that the photochromic effect is not affected.

In the process of the invention, the photochromic agent can be any photochromic compound or mixture of photochromic compounds conventionally employed in ophthalmic optics.

The preferred photochromic compounds are spirooxazine and chromene compounds.

Photochromic spirooxazine compounds are compounds which are well known in the art and are disclosed, inter alia, in U.S. Pat. Nos. 5,139,707 and 5,114,621 (spiro(indoline-quinazolinoxazine) and spiro(indoline-benzothiazolooxazine)), EP-A-245,020 (spiro[indoline-[2,3']-benzoxazine]), JP-A-03251587 (spiro[indoline-[2,3']-benzoxazine] substituted at the 6' position) and WO-96/04590 (spiro[indoline-[2,3']-benzoxazine] having a cyano or phenylsulphonyl group at the 6' position).

Chromenes are also well known photochromic compounds. These compounds are disclosed, inter alia, in U.S. Pat. No. 5,066,818, WO 92/09593, EP-A-401,958, EP-A-562,915 and WO 93/17071.

The preferred chromenes are napthopyrans. More preferably, the napthopyrans carry a free hydroxyl group. The naphthopyran preferably corresponds to the formula of an indeno[2,1-f]naphtho[1,2-b]pyran and, in this case, the free hydroxyl group is attached to the indeno group at the 13 position. Finally, the preferred napthopyrans comprise two phenyl groups at the 3 position of the pyran group.

The preferred chromenes are the photochromic compound (I) and the photochromic compound d described hereinbelow.

The photochromic compounds comprising a nucleus of chromene type exhibit better stability and better spectrokinetic performances within a hydrogel than the spirooxazines.

The solvents for dissolving the photochromic agent can be any solvent or mixture of solvents in which the photochromic agent is at least partially soluble. The solvent is preferably a dipolar aprotic solvent. The preferred solvents are The lenses are sterilized at 121° C. for 20 minutes.

A UV-visible absorption spectrum is again run before and after exposure to UV radiation.

The results observed are combined in TABLE I below.

| Example No. | Lens | Hydrophilicity % | Photochromic solution | Appearance of the lens after UV exposure | Preservation of the photochromism after sterilization |
|---|---|---|---|---|---|
| 1 | HEMA | 37 | DMSO/PPG (I) (0.05%) | Homogeneous colouring | Yes, but highly attenuated photochromic effect |
| 2 | HEMA | 37 | NMP/PPG (I) (0.05%) | Homogeneous colouring | Yes, but highly attenuated photochromic effect |
| 3 | Lunelle ® | 70 | NMP/PPG (I) (0.05%) | Homogeneous blue colouring | Yes |
| 4 | Lunelle ® | 70 | DMSO/PPG (I) (0.05%) | Homogeneous blue colouring | Yes |
| 5 | Menicon Soft ® 72 | 72 | DMSO/PPG (I) (0.1%) | Purple colouring | Yes |
| 6 | Menicon Soft ® 72 | 72 | NMP/PPG (I) (0.109%) | Homogeneous purple colouring | Yes |
| 7 | Rythmic ® | 73 | DMSO/PPG (I) (0.05%) | Homogeneous blue colouring | Yes |
| 8 | Rythmic ® | 73 | NMP/PPG (I) (0.05%) | Homogeneous blue colouring | Yes |
| 9 | Gentle Touch ® | 65 | NMP/PPG (I) (0.102%) | Navy blue colouring | Yes |

N-methylpyrrolidone (NMP), dimethyl sulphoxide (DMSO), diethylene glycol and tetrahydrofuran (THF). The particularly preferred solvents are NMP and DMSO.

The concentration of photochromic agent in the impregnating solution is generally from $10^{-4}$ to 1% by weight, preferably from 0.05 to 0.25% by weight.

The impregnating of the material is generally carried out by immersion, at room temperature, of the polymeric material in the photochromic solution with stirring. The duration of immersion varies according to the nature of the polymeric material and of the photochromic agent solution and is generally of the order of 5 minutes.

The impregnating is carried out into the body, that is to say to the core, of the hydrogel and, consequently, the hydrogel, and in particular the final contact lens as well, comprises the photochromic compound incorporated throughout its body.

After impregnating, the polymeric material is treated with an aqueous solution, for example physiological saline, in order to replace the impregnated solvent with the aqueous solution.

The following examples illustrate the present invention. In the examples, except when otherwise indicated, all the percentages and parts are expressed by weight.

EXAMPLES 1 to 9

Commercial lenses in the hydrated state were immersed in 2 ml of different photochromic solutions of a photochromic compound (I) and subjected to the treatment for 5 minutes while stirring with a plate.

On conclusion of the steeping, the lenses are rinsed with physiological saline and then immersed in this saline until they have recovered their initial diameter (approximately ten minutes).

The lenses are then exposed to UV radiation for 2 minutes.

A UV-visible absorption spectrum is run on the lenses before and after exposure to UV radiation.

HEMA (Essilor): hydroxyethyl methacrylate polymer

Lunelle® (Essilor): MMA/NVP copolymer

Menicon Soft® 72 (Menicon Europe): N,N-dimethylacrylamide/methyl methacrylate/N-vinylpyrrolidone copolymer Rythmic® (Essilor): MMA/NVP copolymer Gentle Touch® (PHB): methyl methacrylate/N,N-dimethylacrylamide copolymer.

Photochromic compound (I)

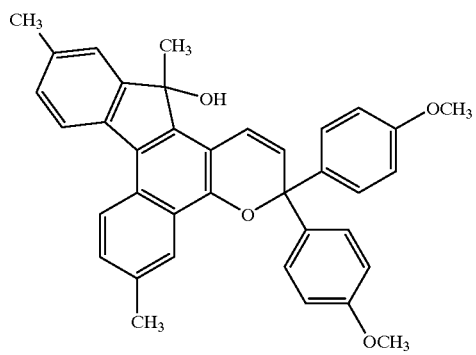

The synthesis of this photochromic compound is disclosed in U.S. Pat. No. 5,645,767.

EXAMPLES 10 to 27

Various commercial contact lenses were treated, by proceeding as above, with different photochromic solutions. The photochromic compounds used are as follows:

Chromenes

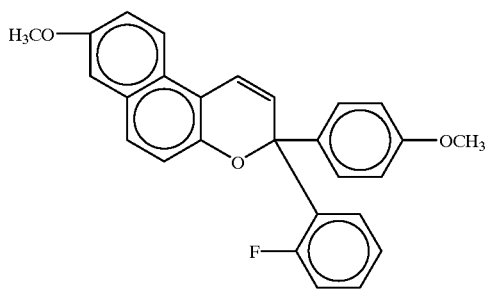
a

This compound is disclosed in Patent Application WO 93/17071.

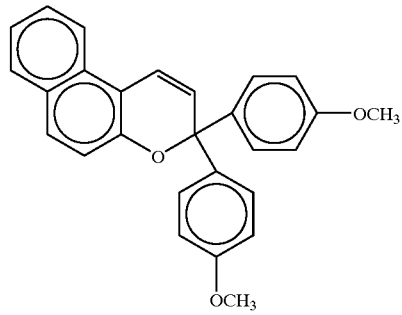
b

The synthesis of this photochromic compound is disclosed in U.S. Pat. No. 5,520,853.

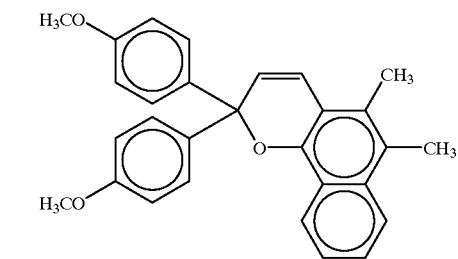
c

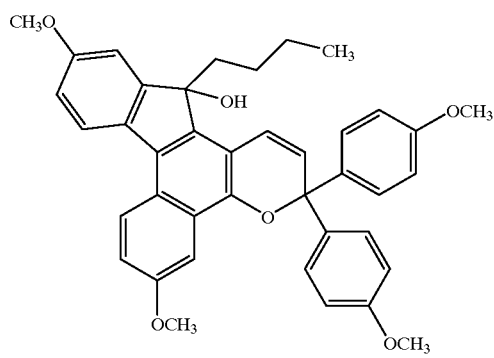
d

The synthesis of this photochromic compound is disclose in a general way in U.S. Pat. No. 5,645,767.

Spirooxazines

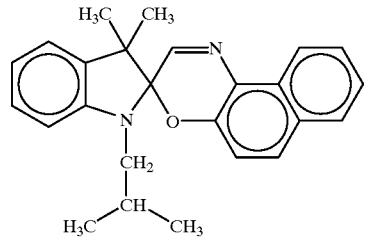
e

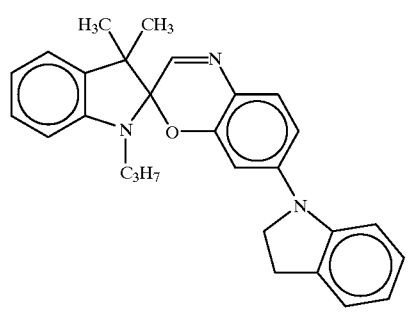
f

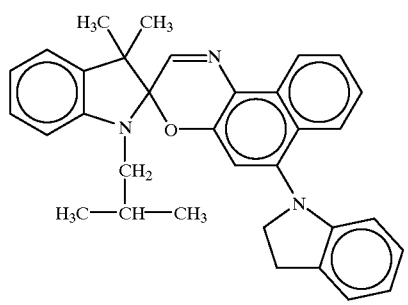
g

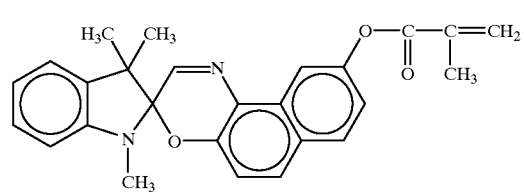
h

The compound h is disclosed in European Patent EP 277,639.

The compounds c, e, f and g are commercially available from the company James Robinson.

The results are given in TABLE II.

TABLE II

| Example No. | Lens | Solvent | Photochromic agent | Appearance of the lens after UV treatment | Preservation of the photochromism after sterilization |
|---|---|---|---|---|---|
| 10 | Lunelle ® | DMSO | a (0.10%) | Vivid orange red colouring | Yes |
| 11 | Lunelle ® | Diethylene glycol | a (0.105%) | Orange colouring | Yes |
| 12 | Lunelle ® | THF | a (0.106%) | Orange colouring | Yes |
| 12 | Menicon Soft ® 72 | DMSO | a (0.101%) | Homogeneous orange colouring | Yes |
| 14 | Menicon Soft ® 72 | NMP | a (0.104%) | Homogeneous orange colouring | Yes |
| 15 | Lunelle ® | NMP | b (0.05%) | Homogeneous orange red colouring | Yes |
| 16 | Lunelle ® | DMSO | b (0.101%) | Blood red colouring | Yes |
| 17 | Menicon Soft ® 72 | DMSO | b (0.101%) | Homogeneous orange colouring | Yes |
| 18 | Menicon Soft ® 72 | NMP | b (0.106%) | Homogeneous orange colouring | Yes |
| 19 | Lunelle ® | NMP | c (0.102%) | Homogeneous red colouring | Yes |
| 20 | Lunelle ® | DMSO | d (0.104%) | Homogeneous bottle green colouring | Yes |
| 21 | Lunelle ® | NMP | d (0.106%) | Bottle green colouring | Yes |
| 22 | Menicon Soft ® 72 | DMSO | d (0.104%) | Homogeneous blue-green colouring | Yes |
| 23 | Menicon Soft ® 72 | NMP | d (0.106%) | Homogeneous blue-green colouring | Yes |
| 24 | Lunelle ® | NMP | e (0.103%) | Royal blue colouring | Yes |
| 25 | Lunelle ® | NMP | f (0.1%) | Turquoise blue colouring | Yes |
| 26 | Lunelle ® | NMP | g (0.101%) | Turquoise blue colouring | Yes |
| 27 | Lunelle ® | NMP | h (0.101%) | Intense blue-green colouring | Yes |

Comparative tests (comparison of the kinetics of colouring in different materials)

Three contact lenses are rendered photochromic by the process of the invention (the photochromic compound incorporated is the compound (II)) using a 0.1% solution of compound (I).

Their kinetic performances are composed with those of contact lenses obtained by the cast in place process.

For this, each of the contact lenses is subjected to UV radiation of 6.87 W/m² and radiaton in the visible region of 50.47 klux, for a period of 10 minutes.

The photochromic compound reaches its maximum colouring in this period of time and the graph of T (transmission) against f (time) is recorded during the period of colouring, the transmission values being measured for a wavelength λ corresponding to the absorption maximum of the photochromic compound ($\lambda_{max}$).

The half-colouring time, that is to say the time necessary to pass from $D_0$ (initial optical density in the unexcited state) to $$\frac{(D_{10} - D_0)}{2} + D_0,$$

where $D_{10}$ represents the optical density of the contact lens after irradiating for 10 minutes at the wavelength $\lambda_{max}$, is subsequently measured.

| Contact lenses according to the invention | ½ Colouring time |
|---|---|
| Gentle Touch ® MMA/DMAA | 15 seconds |
| Lunelle ® MMA/NVP | 21 seconds |
| Menicon ® 72 | 48 seconds |
| MMA/DMAA/NVP | |

Lenses according to the prior art

Lenses are manufactured by the cast in place process.

Three HEMA-based formulations are tested:

| | HEMA 1 | HEMA 2 | HEMA 3 |
|---|---|---|---|
| HEMA | 100 | 100 | 100 |
| Ethylene glycol dimethacrylate | 0.2% | 0.2% | 0.2% |
| AIBN | 0.5% | 0.1% | 0.1% |
| Photochromic compound (I) | 0.5% | 1% | 0.5% |

The polymerization of the lenses is carried out in bulk and thermally.

The temperature cycle varies from 40° C. to 120° C. (rise increasing according to a cycle of 50–60 hours).

The 1/2 colouring times are measured on the lenses obtained:

| | ½ Colouring time |
|---|---|
| HEMA 1 | 65 seconds |
| HEMA 2 | 90 seconds |
| HEMA 3 | 80 seconds |

Other comparative tests are carried out.

An MMA (30)/NVP (70)/allyl methacrylate/AIBN/photochromic compound (I) mixture is polymerized.

None of the tests carried out resulted in a lens exhibiting acceptable photochromic characteristics (irremediably coloured lenses, loss of the photochromic effect).

It is therefore seen that the process of the invention results, via mild conditions, in lenses with photochromic properties which are improved with respect to the prior art with regard to the photochromic performances and the stability.

In the case of ophthalmic lenses, the photochromic agent is incorporated at least in the central optical region of the lens. The central optical region is that which confers the corrective properties of the contact lens, if it is a corrective contact lens.

What is claimed is:

1. A process for producing a polymeric material comprising:
   a) dissolving a photochromic agent in a solvent or mixture of solvents to obtain a photochromic impregnating solution;
   b) impregnating a crosslinked, transparent, hydrophilic polymeric material suitable for an optical and/or opthalmic article with the photochromic impregnating solution to obtain a material impregnated with the photochromic solution;
   c) rinsing the impregnated material with an aqueous solution to substantially replace the impregnated solvent with the aqueous solution; and
   d) recovering the resulting photochromic polymeric material.

2. The process of claim 1, wherein the crosslinked, hydrophilic and photochromic polymeric material has a degree of hydrophilicity of at least 10%.

3. The process of claim 1, wherein the crosslinked, hydrophilic and photochromic polymeric material has a degree of hydrophilicity of at least 35%.

4. The process of claim 1, wherein the crosslinked and hydrophilic polymeric material is hydrated prior to impregnating.

5. The process of claim 1, wherein the photochromic agent comprises at least one spirooxazine or chromene.

6. The process of claim 5, wherein the photochromic compound is a naphthopyran comprising at least one free hydroxyl group.

7. The process of claim 6, wherein the naphthopyran is an indeno[2,1-f]naphtho[1,2-b]pyran.

8. The process of claim 7, wherein the at least one free hydroxyl group is attached to the indeno group at the 13 position.

9. The process of claim 6, wherein the naphthopyran comprises two phenyl groups at the 3 position of the pyran ring.

10. The process of claim 1, wherein the crosslinked and hydrophilic polymeric material is further defined as a multiphase material comprising at least one hydrophilic phase and at least one hydrophobic phase.

11. The process of claim 10, wherein the crosslinked and hydrophilic polymeric material is a two-phase material.

12. The process of claim 10, wherein the crosslinked polymeric material is further defined as a copolymer of at least one hydrophilic monomer and of at least one hydrophobic monomer.

13. The process of claim 12, wherein the at least one hydrophilic monomer is non-ionic.

14. The process of claim 12, wherein the at least one hydrophilic monomer is N-vinylpyrrolidone, hydroxyethyl methacrylate, or N,N-dimethylacrylamide.

15. The process of claim 13, wherein the at least one hydrophobic monomer is a $C_1$–$C_{10}$ alkyl(meth)acrylate.

16. The process of claim 12, wherein the hydrophilic monomer is a N-vinylpyrrolidone and the hydrophobic monomer is a [+]methyl methacrylate.

17. The process of claim 12, wherein the polymeric material is a copolymer of methyl methacrylate and of N-vinylpyrrolidone, a copolymer of N,N-dimethylacrylamide, methyl methacrylate and N-vinylpyrrolidone, or a copolymer of methyl methacrylate and N,N-dimethylacrylamide.

18. The process of claim 17, wherein the polymeric material is a copolymer comprising about 30% by weight methyl methacrylate and about 70% by weight N-vinylpyrrolidone.

19. The process of claim 1, wherein the solvent is a dipolar aprotic solvent.

20. The process of claim 19, wherein the solvent is dimethyl sulphoxide (DMSO) or N-methylpyrrolidone (NMP).

21. The process of claim 20, wherein the material is in the form of an optical or ophthalmic article.

22. The process of claim 21, wherein the article is a contact lens.

23. The process of claim 21, wherein the photochromic agent is incorporated at least in a central optical region of the lens.

24. The method of claim 1, wherein the crosslinked, transparent, hydrophilic polymeric material suitable for an optical and/or ophthalmic article is further defined as a material suitable for a contact lens.

25. The method of claim 1, further defined as a method of producing a contact lens comprising recovering a photochromic contact lens.

* * * * *